(12) United States Patent
Bar-Zakai

(10) Patent No.: US 7,542,475 B2
(45) Date of Patent: Jun. 2, 2009

(54) COMMUNICATION BETWEEN USERS LOCATED BEHIND A NAT DEVICE

(75) Inventor: Asaf Bar-Zakai, Rehovot (IL)

(73) Assignee: Tadiran Telecom Ltd., Petach-Tikva (IL)

( * ) Notice: Subject to any disclaimer, the term of this patent is extended or adjusted under 35 U.S.C. 154(b) by 958 days.

(21) Appl. No.: 10/890,200

(22) Filed: Jul. 14, 2004

(65) Prior Publication Data
US 2005/0044247 A1 Feb. 24, 2005

(30) Foreign Application Priority Data
Jul. 15, 2003 (IL) .................................. 156924

(51) Int. Cl.
H04L 12/66 (2006.01)
(52) U.S. Cl. .................. 370/401; 370/230; 370/389; 709/220
(58) Field of Classification Search .............. 370/401, 370/352, 230, 392
See application file for complete search history.

(56) References Cited

U.S. PATENT DOCUMENTS

| 6,567,405 | B1 | 5/2003 | Borella et al. | |
|---|---|---|---|---|
| 7,006,436 | B1 * | 2/2006 | Chu et al. | 370/230 |
| 7,313,145 | B1 * | 12/2007 | Bradd et al. | 370/401 |
| 7,327,721 | B2 * | 2/2008 | Balasaygun et al. | 370/352 |
| 7,330,463 | B1 * | 2/2008 | Bradd et al. | 370/352 |
| 2002/0085561 | A1 * | 7/2002 | Choi et al. | 370/392 |
| 2002/0141384 | A1 | 10/2002 | Liu et al. | |

FOREIGN PATENT DOCUMENTS

WO WO 02/073330 9/2002

* cited by examiner

Primary Examiner—Fan Tsang
Assistant Examiner—Simon King
(74) Attorney, Agent, or Firm—Browdy and Neimark, P.L.L.C.

(57) ABSTRACT

A method is provided for use in communication between a first and second telephony users wherein both users are located behind a NAT/FW server. The method comprises determining that both these telephony users are located behind one common NAT/FW server in order to allow establishing a direct communication session between the two of them, thereby eliminating the need of being connected to a remote agent for the duration of the whole session.

2 Claims, 4 Drawing Sheets

COMMUNICATION BETWEEN USERS LOCATED BEHIND A NAT DEVICE

FIELD OF THE INVENTION

The present invention relates to transmitting communications in a packet switched network and, more specifically, to establishing and maintaining Internet telephony communications in a case where a network address translation (hereinafter: "NAT") device or a firewall (hereinafter: "FW") device are used.

BACKGROUND OF THE INVENTION

Recently, voice telephone service has been implemented over the Internet. Improvements made in the transmission of data over the Internet (speed and quality) and Internet bandwidth have made it possible for voice calls to be communicated using the Internet's packet switched architecture and the TCP/IP protocol.

Software is used nowadays on personal computers to enable the two-way transfer of real-time voice information via an Internet data link between two personal computers (each of which is referred to as an end point or client), by incorporating appropriate hardware for driving a microphone and a speaker. Each end point operates simultaneously both as a sender of real time voice data and as a receiver of real time voice data to support a full duplex voice call. Software then allows data compression down to a rate compatible with the end point computer's data connection to an Internet Service Provider (ISP) and encapsulation of the digitized and compressed voice data into a frame which is then sent to the other end point via the Internet.

As a receiver of real time voice data, the end point computer and software reverse the process to recover the information for presentation to the receiver.

The ITU Q.931 standard relates to call signaling and set up, the ITU H.245 standard provides for negotiation of channel usage and compression capabilities between the two endpoints, and the ITU H.323 standard provides for real time voice data between the two end points to occur utilizing UDP/IP to deliver the real time voice data.

A problem associated with the recommendations set by the various standardization bodies such as those set by the ITU-T is that if one of the end points is on a private network behind a network address translation (NAT) firewall, the other endpoint can not send theses (e.g. UDP/IP) frames through the NAT firewall onto the private network for delivery to the private network endpoint. More specifically, ITU Internet telephony standards provide for each endpoint to designate a port number for receipt of the frames representing audio data and to communicate the IP address and designated port for receipt of the audio frames to the other endpoint. Because the private network client does not have a globally unique IP address, a frame sent to such non-globally unique IP address cannot be routed on the Internet and will be lost. Further, even if the private network client were able to identify and designate the IP address of the NAT firewall, the private network client has no means for establishing a port on the NAT firewall for receipt of audio frames.

Because of the recently wide spread use of NAT firewalls which typically provide both IP address translation and port translation of all frames sent from the private network to the Internet, various methods were developed to enable establishing and maintaining internet telephony calls between two clients even if one of them is located on a private network behind a NAT firewall.

U.S. Pat. No. 6,567,405 discloses a method and protocol for Distributed Network Address Translation ("DNAT"), such as in small office/home office networks or other legacy local networks that have multiple network devices using a common external network address to communicate with an external network. The system disclosed includes a port allocation protocol to allocate globally unique ports to network devices on a local network. The globally unique ports are used in a combination network address with a common external network address such as an Internet Protocol ("IP") address, to identify multiple network devices on a local network to an external network such as the Internet, an intranet, etc. Thus, the DNAT helps overcome the large computation burdens encountered when the translation of the network address is done by a router.

US 20020141384 discloses a system and method for determining a communication path for communicating audio data through an address and port translation device between a first and a second telephony user. According to the method disclosed, a call signaling connection is established between the first telephony user located on a private network and the second telephony user on the Internet, and the call signaling connection is used to provide to the first telephony user an IP address and port number of the second telephony user so as to enable receipt transmitted packets from the first telephony user. When such packets are received by the second telephony user, the source IP address and source port number are extracted and the extracted IP address is compared with an IP address provided by the first telephony user so as to allow the determination that the first telephony user is located on a private network. The second telephony user then utilizes the extracted IP address and port number as the destination IP address and port number for sending the transmission to the first telephony user.

WO 02/073330A2 discloses a method of audio communication utilizing transmissions between a first telephony user located behind a NAT server and a remote second telephony user, where each of the clients utilizes a single port number for both sending and receiving transmissions. By the method disclosed, a transmission is sent from the first telephony user to the second telephony user on a UDP/IP channel utilizing a destination IP address and port number provided by the second telephony user. The second telephony user then extracts the Source IP address and source port number from the received transmission to determine if the first telephony user is located behind a NAT server. If the first telephony user is located behind a NAT server, the extracted source IP address and port number are stored and used to send transmissions to the first telephony user located behind the NAT server.

The disclosures of all references mentioned above and throughout the present specification are hereby incorporated herein by reference.

However, one of the drawbacks of the solutions provided by the prior art, is, that none of them provide an adequate solution to the problem of how to identify two remote telephony users located behind the same NAT or FW (hereinafter "NAT", and/or "FW" and/or "NAT/FW") server, in order to create a session between the two of them without using any external proxy (for example when a session is to be held between two telephony users both located at the same remote private network protected by a NAT/FW server).

SUMMARY OF THE INVENTION

One object of the present invention is to improve the efficiency of utilizing the network resources by allowing a call between two telephony users residing behind a shared NAT/

FW server, to communicate between themselves while eliminating the need to do so through the mediation of a remote agent.

It is another object of the present invention to provide an apparatus and a system that allow such communication. Further objects and features of the invention will become apparent from the following description and the accompanying drawings.

According to a first aspect of the invention there is provided a method for use in communication between a first and a second telephony users wherein said first and second telephony users are located in a network extending behind a NAT/FW server, which method comprises determining that both telephony users are located behind one NAT/FW server to allow establishing of a direct communication session between said first telephony user and said second telephony user within said network, thereby eliminating the need of being connected to said remote agent for the duration of the whole of said communication session.

According to an embodiment of the invention, a method is provided to allow the establishing of a direct communication session, in a case where a unique IP address is associated with said NAT/FW server. The method comprises the steps of:
   a) sending a first message by a first telephony user to a remote agent, to allow the identification of that first telephony user by the remote agent. This first message comprises an indication of a private network address associated with the first telephony user and an indication of the unique network address of the NAT/FW server behind which the first telephony user is located;
   b) retrieving the private address associated with the first telephony user, and the unique network address of the NAT/FW server, from the first message;
   c) determining whether the first telephony user and a second telephony user, with whom a communication session should be established, are located behind one common NAT/FW server, by:
      c1) if an indication of a private network address associated with the second telephony user has already been retrieved by the remote agent, establishing, based on the information available on both telephony users whether each of them is located behind a NAT/FW server, and whether that NAT/FW server is the same NAT/FW server for both of them.
      C2) if an indication of a private network address associated with the second telephony user has not yet been retrieved by the remote agent, then a second message is sent by the second telephony user to the remote agent, to allow identifying this second telephony user by the remote agent, where this second message comprises an indication of a private network address associated with the second telephony user and an indication of the unique address of the NAT/FW server behind which the second telephony user is located. Based on the information retrieved about both telephony users, establishing whether each of them is located behind a NAT/FW server, and if that NAT/FW server is the same NAT/FW server for both of them.
   d) in the case that the determination is positive, sending a message to each of the first-and second telephony users, which comprises an indication of the private network address associated with the other telephony user; and
   e) establishing a communication session between the first telephony user and the second telephony user in which a plurality of messages is directly transmitted therebetween, and wherein this plurality of messages is not transmitted via the remote agent.

According to another embodiment of the invention, a method is provided to allow establishing a direct communication session as explained above, in a case where there is a plurality of IP addresses associated with the NAT/FW server. By this embodiment, the method comprises the steps of:
   1) sending a first message by a first telephony user to a remote agent, to allow the identification of that first telephony user by the remote agent. This first message comprises an indication of a private network address associated with the first telephony user and an indication of a telephone zone code associated with the first telephony user;
   2) retrieving the private address associated with the first telephony user, and the indication of the telephone zone code associated with the first telephony user, from the first message;
   3) determining whether the first telephony user and a second telephony user, with whom a communication session should be established, are located behind one common NAT/FW server, by:
      3a) if an indication of a private network address associated with the second telephony user has already been retrieved by the remote agent, establishing, based on the information available on both telephony users whether each of them is located behind a NAT/FW server, and if they are both located at the same telephone zone code; and
      3b) if an indication of a private network address associated with the second telephony user has not yet been retrieved by the remote agent, then a second message is sent by the second telephony user to the remote agent, to allow identifying this second telephony user by the remote agent, where this second message comprises an indication of a private network address associated with the second telephony user and an indication of a telephone zone code associated with the second telephony user. Based on the information retrieved about both telephony users, establishing whether each of them is located behind a NAT/FW server, and whether they are both located at the same telephone zone code.
   4) in the case that the determination is positive, sending a message to each of the first and second telephony users, which comprises an indication of the private network address associated with the other telephony user; and
   5) establishing a communication session between the first telephony user and the second telephony user in which a plurality of messages is directly transmitted therebetween, and wherein this plurality of messages is not transmitted via the remote agent.

According to yet another preferred embodiment of the invention the above steps a) and b), or 1) and 2) as the case may be, can be carried out at the first time that a communication is established between the first telephony user (or each of the two telephony users) and the remote agent, and the information about each such user is stored at the remote agent. In such a case, preferably, when the first user wishes to establish a communication session with the second telephony user, upon establishing communication with the NAT/FW server and identifying the requested second telephony user, the remote agent is operative to allow establishing a direct communication session between the two users. Alternatively, (or optionally) that process may be carried out when neither telephony users has previously been identified at the remote agent, so that each of the telephony sends the identifying message at the beginning of the very same communication session that should take place between these two telephony users.

In accordance with another embodiment of the invention, there is provided a method which comprises the steps of:
i) sending a first message by a first telephony user to a remote agent, to allow the identification of that first telephony user by the remote agent. This first message comprises an indication of a private network address associated with the first telephony user;
ii) retrieving the private address associated with the first telephony user from the first message;
iii) in response to receiving that first message, a third message is sent by the remote agent towards the first telephony user;
iv) retrieving from that third message the Media Access Control ("MAC") layer address in the network architecture that is associated with a router that was the last router to route the third message, prior to its receipt by the first telephony user;
v) sending to the remote agent, a fifth message by the first telephony user, wherein this fifth message comprises an indication of the MAC address of that last router;
vi) retrieving from the messages received by the remote agent, an indication whether the first telephony user is located behind a NAT/FW server, a private network address associated with the first telephony user, and the indication of the MAC address of the last router via which the third message was routed;
vii) determining whether the first telephony user and a second telephony user, with whom a communication session should be established, are located behind one common NAT/FW server, by:
vii-a) if an indication of a private network address associated with the second telephony user has already been retrieved by the remote agent, establishing, based on the information available on both telephony users whether each of them is located behind a NAT/FW server, and if that MAC address retrieved for both telephony users is substantially identical for both of them; and
vii-b) if an indication of a private network address associated with the second telephony user has not yet been retrieved by the remote agent, then repeating steps i to vi when that second telephony user communicates with the remote agent, to allow the retrieval of an indication whether the second telephony user is located behind a NAT/FW server, a private network address associated with the second telephony user, and the indication of the MAC address of the last router via which the messages to the second telephony user were routed. Based on the information retrieved about both telephony users, establishing whether each of them is located behind a NAT/FW server, and whether both of them are located behind the same NAT/FW server.
viii) in the case that the determination is positive, sending a message to each of the first and second telephony users, which comprises an indication of the private network address associated with the other telephony user; and
ix) establishing a communication session between the first telephony user and the second telephony user in which a plurality of messages is directly transmitted therebetween, and wherein this plurality of messages is not transmitted via the remote agent.

Preferably, as described above, the process by which the applicable NAT/FW server is identified for one or both of the telephony users may be carried out either at the first time that one or both of them are in communication with the remote agent, e.g. when the telephony user is registered and recognized by the remote agent for the first time as a legitimate user of the network resources, or when the communication session is about to be established between the users.

According to another preferred embodiment, at least one of the indications of the first and second private addresses comprise an identification of a sub-net to which the respective telephony user belongs.

In accordance with a preferred embodiment of the present invention, at least one of the indications of the first and second private addresses, comprise a port number designated for the respective telephony user.

By yet another embodiment of the invention, both first telephony user and second telephony user are located at the same private communication network, located behind a single NAT/FW server.

Still according to another embodiment of the invention, the methods described above further comprise the step of:
upon retrieving the private address associated with the first telephony user, sending a message by the remote agent to the first telephony user, which comprises details about provate addresses of other telephony users belonging to a network extending behind the NAT/FW server.

In accordance with another aspect of the present invention, there is provided a communication system, comprising:
a plurality of communication terminals, each connected along a first communication network;
a NAT/FW server associated with the first communication network and a second communication network, and adapted to be in communication with each of the plurality of communication terminals;
a remote agent associated with the second communication network, adapted to be in communication with the NAT/FW server and comprises:
a first processing means adapted to retrieve addressing information associated with the plurality of communication terminals;
a first database operative to store the addressing information; and
a second processing means adapted to retrieve information from the first database and in a case where a communication session is to be carried out between two of the plurality of communication terminals, forward a message towards these two of the communication terminals, providing them with information required to establish a direct communication session therebetween.

According to an embodiment of this aspect of the invention, at least one of the two of said plurality of communication terminals comprises a database adapted to store information received from said remote agent and identifying a private address associated with at least one other of said plurality of communication terminals.

DESCRIPTION OF THE DRAWINGS

A better understanding of the present invention is obtained when the following non-limiting detailed description is considered in conjunction with the following drawings in which.

DETAILED DESCRIPTION OF THE INVENTION

Figure 1:
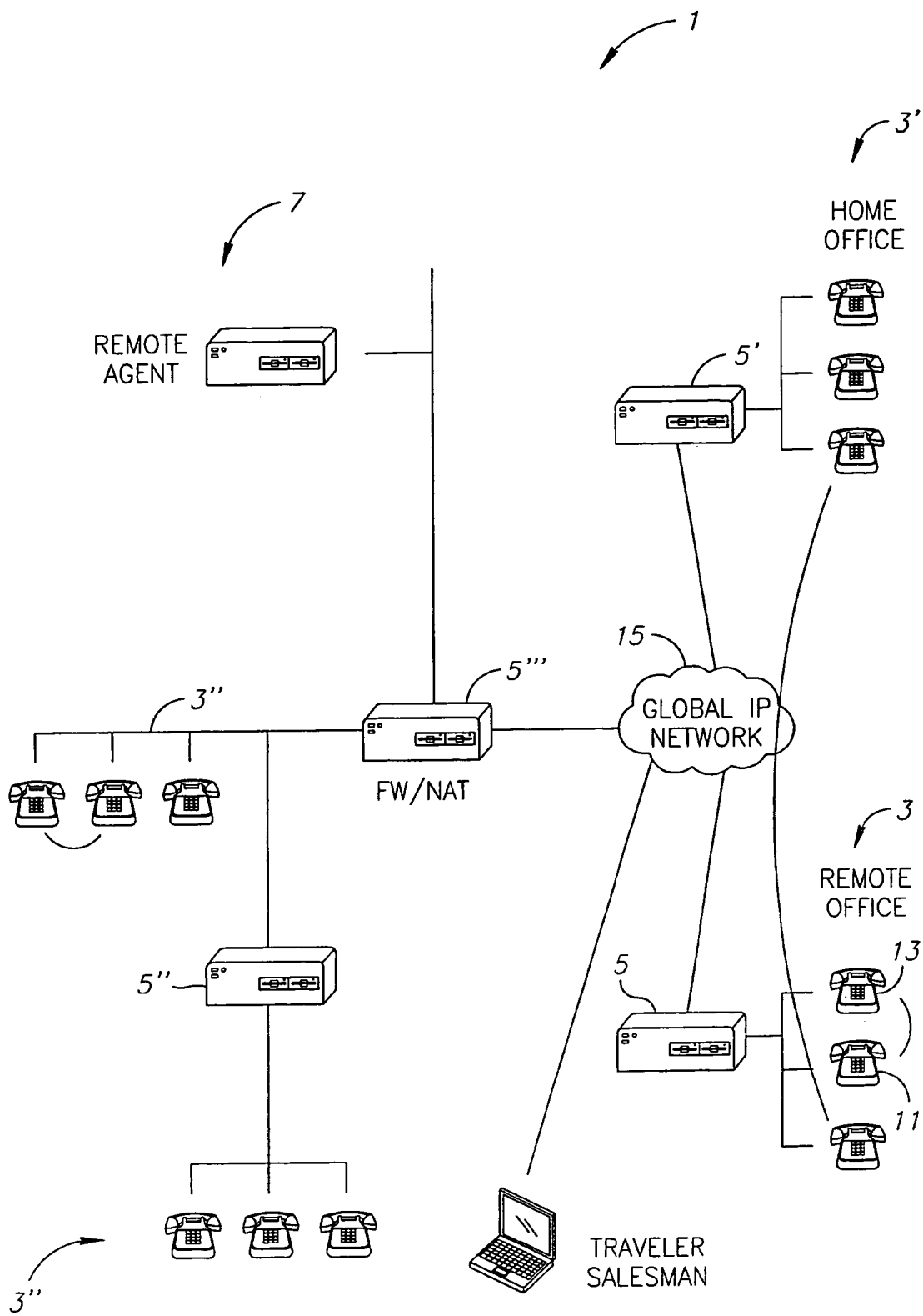
FIG. 1. presents a schematic illustration of the system according to the preferred embodiment of the present invention.

Turning now to FIG. 1, which schematically illustrates a typical system, 1, according to an embodiment of the present invention. The system comprises a number of local private networks (3, 3', 3" and 3'") each extending behind a NAT/FW server (5, ', 5" and 5'", respectively), and comprising a number of users, e.g. telephony users.

Let us consider now a case where a communication session is to be established between telephony user 11 and telephony user 13. The solution as provided by the art is that each of the telephony users 11 and 13, establishes a communication session with remote agent 7 through NAT server 5, and during the establishment of the session, remote agent 7 would be provided with the IP address of the NAT server 5 and with the designated port No. of each of these telephony users. During the communication session, a transmission sent from user 11 through the designated port at NAT server 5, through IP network 15 and all routers that are located along the path extending between server 5 and remote agent 7. When the transmission arrives at remote agent 7, based on the destination information provided, it is forwarded back towards NAT server 5, and then routed to the designated port that corresponds to telephony user 13. According to the solution provided by the embodiment of the present invention, remote agent 7 checks whether a transmission received, is received from a user that is located behind a NAT/FW server. Once it is determined that this is the case, the remote agent checks whether the other party to the communication session is also located behind a NAT/FW server. When both parties are operative behind such a NAT/FW server, a check is made to determine whether they both operate behind the same NAT/FW server, and once it is determined that this is the case, both parties are provided with information allowing them to communicate directly with each other within the network that extends behind the NAT/FW server. Even though some time it is required by both users to maintain communication with the remote agent, for various reasons, (e.g. for "keep alive" purposes, where the remote agent is being aware that the user is still a registered and authorized user in that network), still most of the traffic load associated with that communication session will not be forwarded to the remote agent, and therefore substantial shorter transmission times are achieved, as well as reducing bandwidth utilization and improving on the communication quality.

Figure 2:
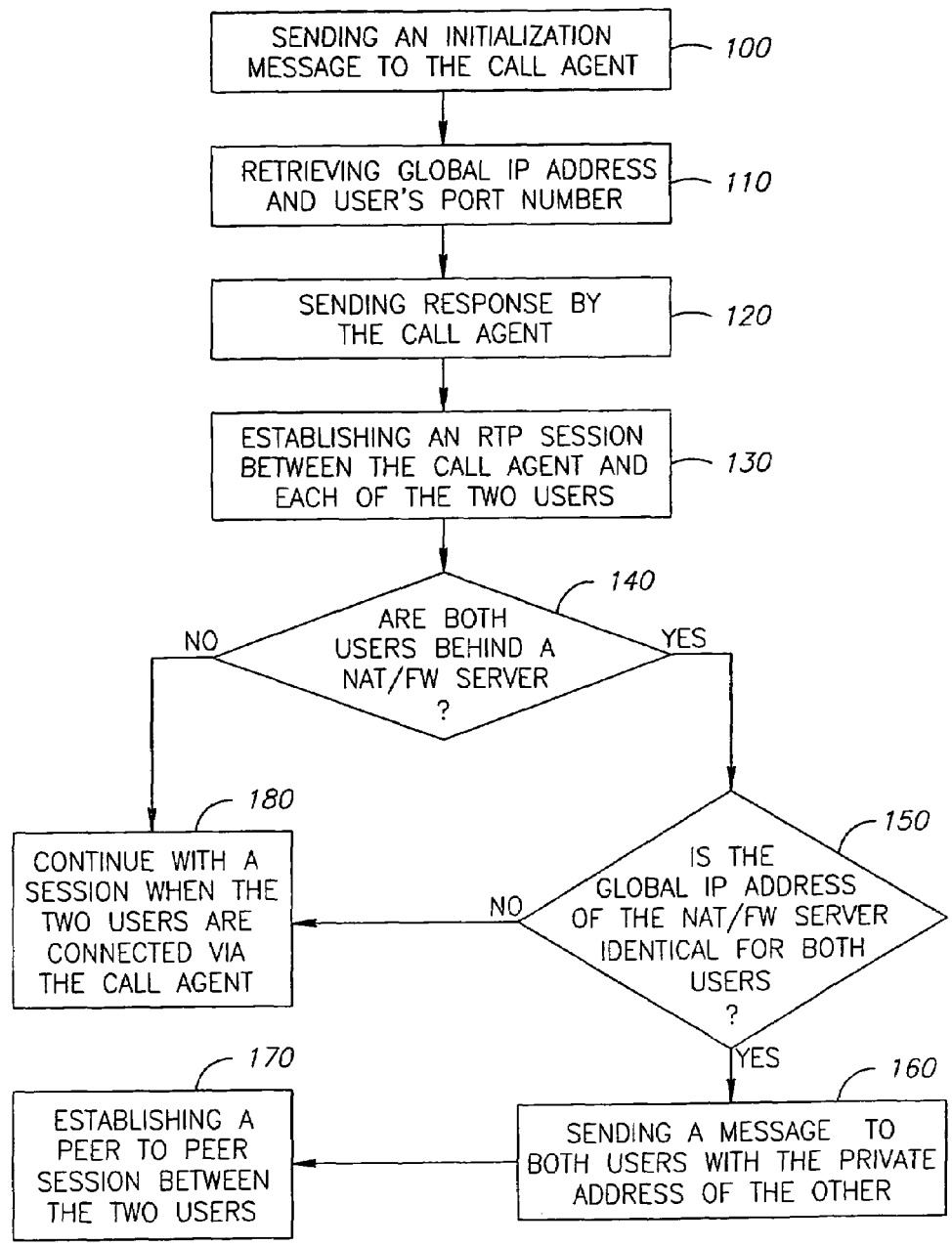
FIGS. 2 to 4, illustrate flow charts describing the operation of preferred embodiments according to the present invention.

FIG. 2 illustrates a flow chart describing the operation of a preferred embodiment according to the present invention, with reference to the system illustrated in FIG. 1.

Upon initialization of the communication session, each of IP phone users 11 and 13 sends (step 100) an init message to a remote agent 7, in order to register himself thereat and to receive in response a database from the remote agent. This init message includes self-IP address (private address) of the IP phone user. From the IP header of the init message, remote agent 7 retrieves (step 110) the global IP address associated with NAT server 5, behind which the user is located and the user's private network address e.g. the number of the port allocated to the user that had initiated that init message. In response to the init message, remote agent 7 sends a return message (step 120), e.g. a message comprising relevant details that may be included in the user's database, e.g. certain profiles associated with being the fact that the user now becomes an authorized user in that network, etc., to the corresponding IP phone user.

In the next step, step 130, an RTP session is established between each of the two IP phone users 11 and 13, and remote agent 7. However, if both parties to the requested call have already been identified and registered with remote agent 7, then step 130 could be skipped.

Next, in order to determine whether a peer to peer session may be established between these two IP phone users, it is determined at remote agent 7, whether:
a) both IP phone users are behind a NAT/FW server (step 140); and if so,
b) is the global IP address of the NAT/FW server (kept in a table next to private address from init message) of both Phones are identical for both IP phone users and only the port is different (step 150)?

When the two conditions are found to be true, the remote agent sends (step 160) a message to each of the two IP phone users, to establish a connection within the network extending behind the NAT server, where preferably, this message will also comprise private IP address of other side for use as the appropriate destination address. Upon receipt of this message, a peer to peer session would be established (step 170)

Figure 3:
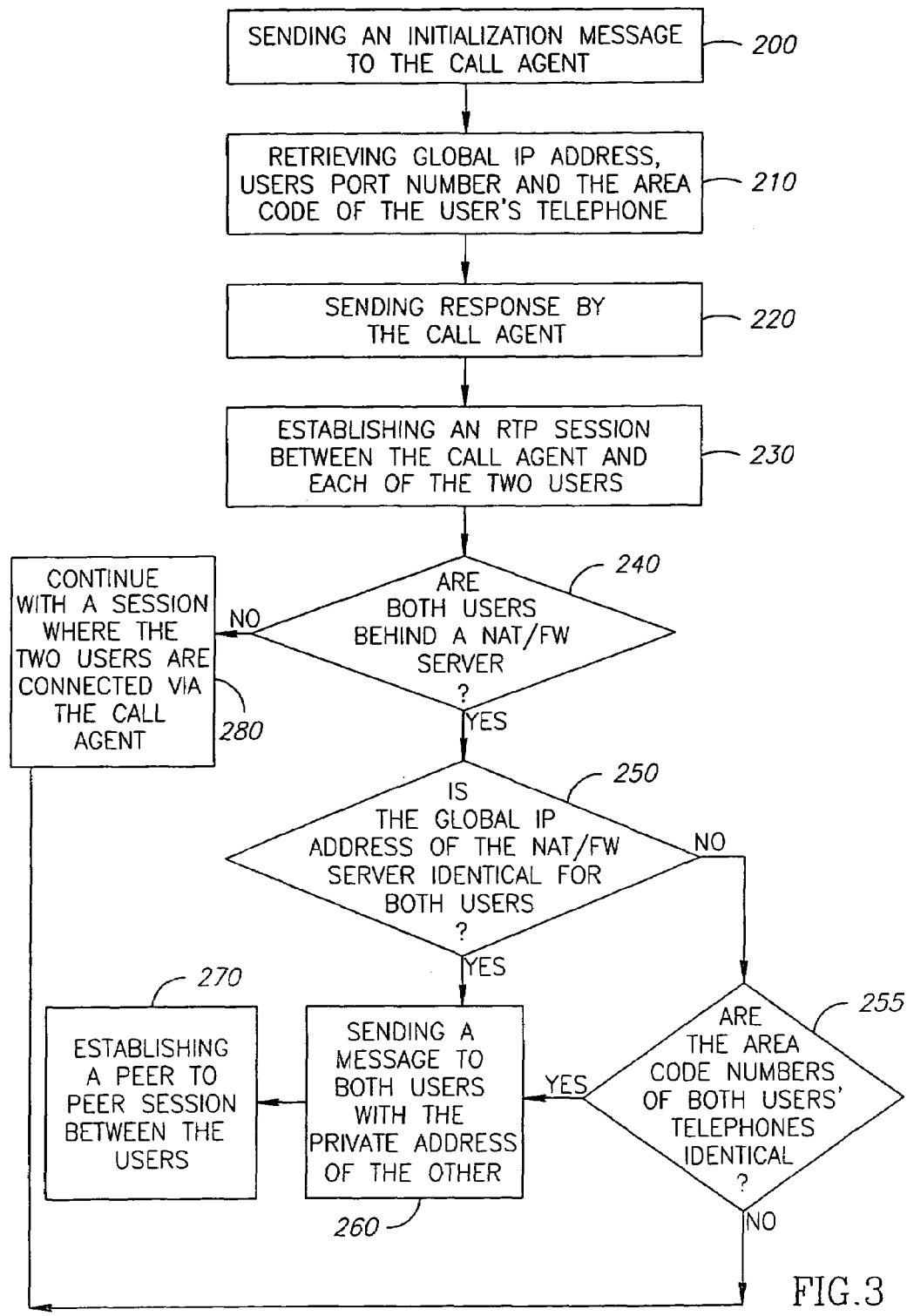

FIG. 3 demonstrates a flow chart describing an embodiment of the present invention for a case where there is a plurality of IP addresses associated with NAT server 5, i.e. there is a pool of global IP addresses kept at NAT server 5, so that there is a need to use other identifier in order to determine if the two IP phone users are located behind same NAT/FW server, as the NAT/FW server may appear as two different NAT/FW servers at the remote agent because of the different IP addresses used.

Similarly to the case described above, upon initialization of the communication session, each of IP phone users 11 and 13 sends (step 200) an init message to remote agent 7. This init message includes self-IP address (private address) of the IP phone user. From the init message, remote agent 7 retrieves (step 210) from each of the init messages a global IP address associated with the corresponding NAT/FW server 5, the number of the port allocated to the user that had initiated that init message, and the area code number of the telephone used. In response, remote agent 7 sends a return message (step 220), e.g. a database message to the corresponding IP phone user.

In the next step, step 230, an RTP session is established between each of the two IP phone users 11 and 13, and remote agent 7. However, if both parties to the requested call have already been identified and registered with remote agent 7, then step 230 could be skipped.

Next, in order to determine whether a peer to peer session may be established between these two IP phone users, it is determined at remote agent 7, whether:
a) both IP phone users are behind a NAT server (step 240); and if so,
b) is the global IP address of the NAT server (kept in a table next to private address from init message) of both Phones are identical for both IP phone users and only the port is different (step 250)?

In this case, condition a) is found to be true, but condition b) is found to be false. In such a case, the following further condition is checked:
c) is the area code number of both IP phones is identical (step 255)?

If that last condition is found to be true, the remote agent sends (step 260) a message to each of the two IP phone users, to establish a connection within the network extending behind the NAT server, where preferably, this message will also comprise private IP address of other side for use as the appropriate destination address.

Figure 4:
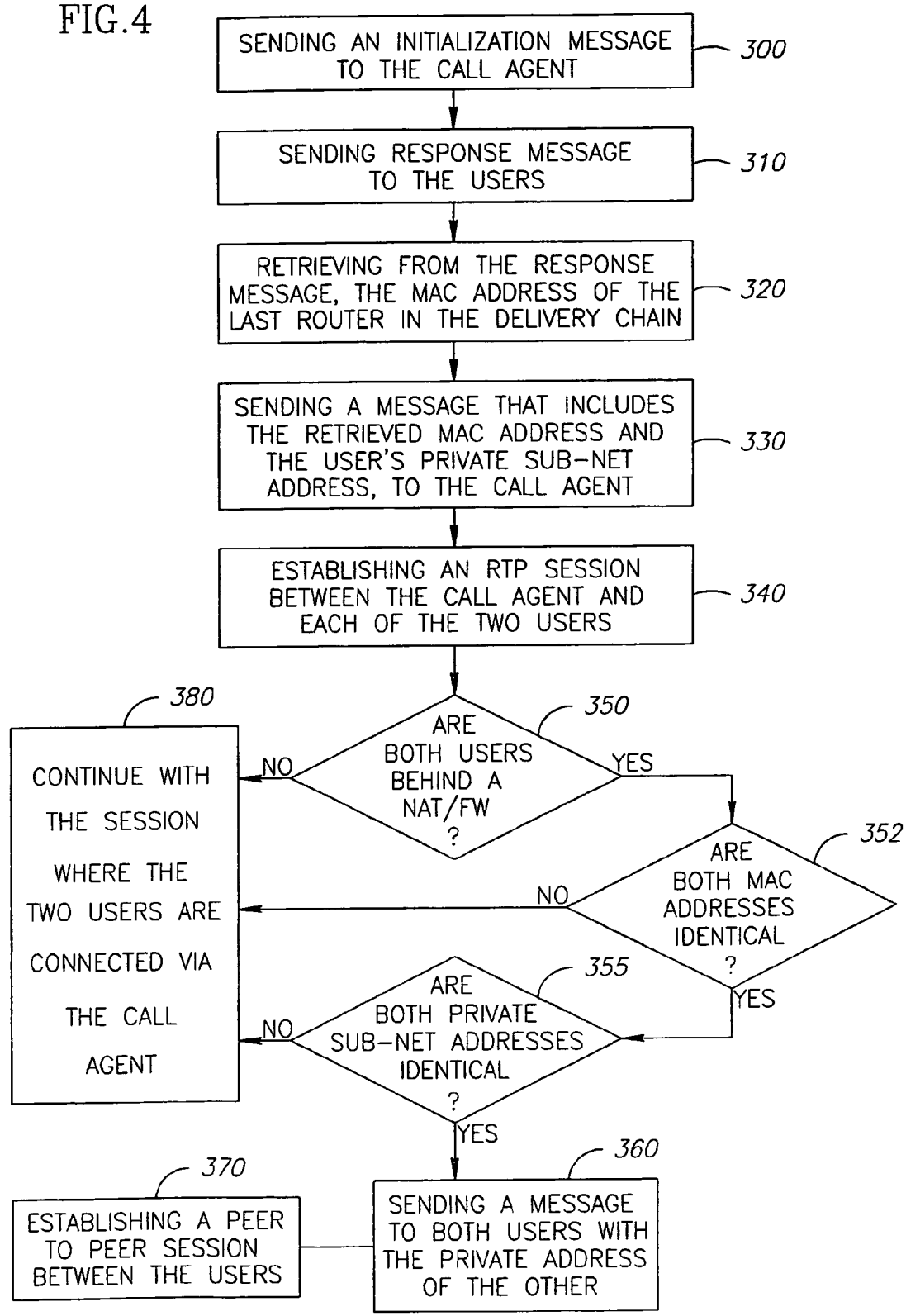

A somewhat different procedure is illustrated in FIG. 4. As before, upon initialization of the communication session, each of IP phone users 11 and 13 sends (step 300) an init message to remote agent 7. This init message includes self-IP address (private address) of the IP phone user. In response, remote agent 7 sends a return message (step 310), e.g. a database message to the corresponding IP phone user. From the return message, each of the IP phone users retrieves (step 320) the MAC address associated with the last router located at the routing chain along which that return message was transmitted. Upon retrieval of this MAC address, each of the IP phone users sends (step 330) to the remote agent, another message that comprises an indication of the MAC address of the corresponding last router and the private sub-net address (for example 172.8.0.0) address associated with that IP phone user.

In the next step, step 340, an RTP session is established between each of the two IP phone users 11 and 13, and remote agent 7.

Next, in order to determine whether a peer to peer session may be established between these two IP phone users, it is determined at remote agent 7, whether:

1. both IP phone users are behind a NAT server (step 350);
2. both MAC addresses (of the last router located along the chain of message delivery for that IP phone user) are identical (step 352); and
3. both private sub-net addresses are identical (step 355).

When all three conditions are found to be true, the remote agent sends (step 360) a message to each of the two IP phone users, to establish a connection within the network extending behind the NAT server, where preferably, this message will also comprise private IP address of other side for use as the appropriate destination address.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow:

What is claimed is:

1. A method for use in communication between a first and a second telephony users wherein said first and second telephony users are located in a network extending behind a Network Address Translation or Firewall server, which method comprises
   determining that both telephony users are located behind a single Network Address Translation or Firewall server to allow establishing a direct communication session between said first telephony user and said second telephony user, thereby eliminating the need of being connected to a remote agent for the duration of said communication session, which comprises the steps of:
   i) sending a first message by a first telephony user to a remote agent, to allow identification of said first telephony user by said remote agent, wherein said first message comprises an indication of a private network address associated with said first telephony user;
   ii) retrieving from said first message a private address associated with said first telephony user;
   iii) sending a third message in response to receiving said first message by said remote agent towards said first telephony user;
   iv) retrieving from said third message the MAC layer address associated with a router that was the last router to route said third message, prior to its receipt by said first telephony user;
   v) sending a fifth message by the first telephony user to said remote agent, wherein said fifth message comprises an indication of the MAC address of said last router;
   vi) retrieving from said messages received by the remote agent, an indication whether said first telephony user is located behind a Network Address Translation or Firewall Server, a private network address associated with said first telephony user, and said indication of the MAC address;
   vii) determining whether the first telephony user and a second telephony user, with whom a communication session should be established, are located behind one common Network Address Translation or Firewall Server, by:
   vii-a) if an indication of a private network address associated with said second telephony user has already been retrieved by said remote agent, establishing, based on the information available on both telephony users, whether each of said first and second telephony users are located behind a Network Address Translation or Firewall Server, and if that Network Address Translation or Firewall Server is the same Network Address Translation or Firewall Server; and
   vii-b) repeating steps i to vi if an indication of a private network address associated with the second telephony user has not yet been retrieved by said remote agent, when said second telephony user is in communication with said remote agent, to allow the retrieval of an indication whether said second telephony user is located behind a Network Address Translation or Firewall Server, a private network address associated with said second telephony user, and the indication of a MAC address of a last router via which the messages to the second telephony user were routed;
   v-ii-c) establishing, based on the information retrieved about both telephony users, whether each of said first and said second telephony users are located behind a Network Address Translation or Firewall Server, and whether said Network Address Translation or Firewall Server is the same Network Address Translation or Firewall Server for both of said telephony users;
   viii. in case that said determining step at vii is positive, send a message to each of the first and second telephony users, which comprises an indication of the private network address associated with the other telephony user; and
   ix. establishing a communication session between said first telephony user and said second telephony user in which a plurality of messages is directly transmitted therebetween, and wherein said plurality of messages is not transmitted via said remote agent.

2. A method according to claim 1, wherein at least one of the indications of said first and/or second private addresses comprise an identification of a sub-net to which the respective telephony user belongs.

* * * * *